United States Patent [19]

Stove

[11] 4,081,963
[45] Apr. 4, 1978

[54] CONTROL CIRCUIT FOR A SERVO-MOTOR

[75] Inventor: Flemming Stove, Sonderborg, Denmark

[73] Assignee: Danfoss A/S, Nordborg, Denmark

[21] Appl. No.: 719,458

[22] Filed: Sep. 1, 1976

[30] Foreign Application Priority Data

Sep. 10, 1975 Germany .............................. 2540293

[51] Int. Cl.² ............................................ F03G 7/06
[52] U.S. Cl. .................................................... 60/528
[58] Field of Search ................... 60/527, 528, 530, 531

[56] References Cited

U.S. PATENT DOCUMENTS

| | | | |
|---|---|---|---|
| 3,374,337 | 3/1968 | Burley | 60/527 X |
| 3,500,634 | 3/1970 | Waseleski | 60/528 |
| 3,860,169 | 1/1975 | Norman | 60/527 X |

*Primary Examiner*—Allen M. Ostrager

[57] ABSTRACT

The invention relates to a control circuit for a servomotor of the type having a piston displaceable to selectable positions in one direction by an expansible substance heatable by an electric heating element and in the other direction by a return spring. The circuit includes a pulsating power supply and a control switch and a thermostatic unit for generating a temperature responsive control voltage. A potentiometer for generating voltages corresponding to different positions of the piston is operably connected to the piston. A comparator for comparing the control voltage with the potentiometer voltage generates a go-no go signal which is relayed to the heating element control switch. Upper and lower limit switches are associated with the selectable positions of the piston. The limit switches selectively override the potentiometer to effect operation of the heating element control switch. Light emitting diodes are provided which give visual indications of the heating and cooling cycles.

5 Claims, 1 Drawing Figure

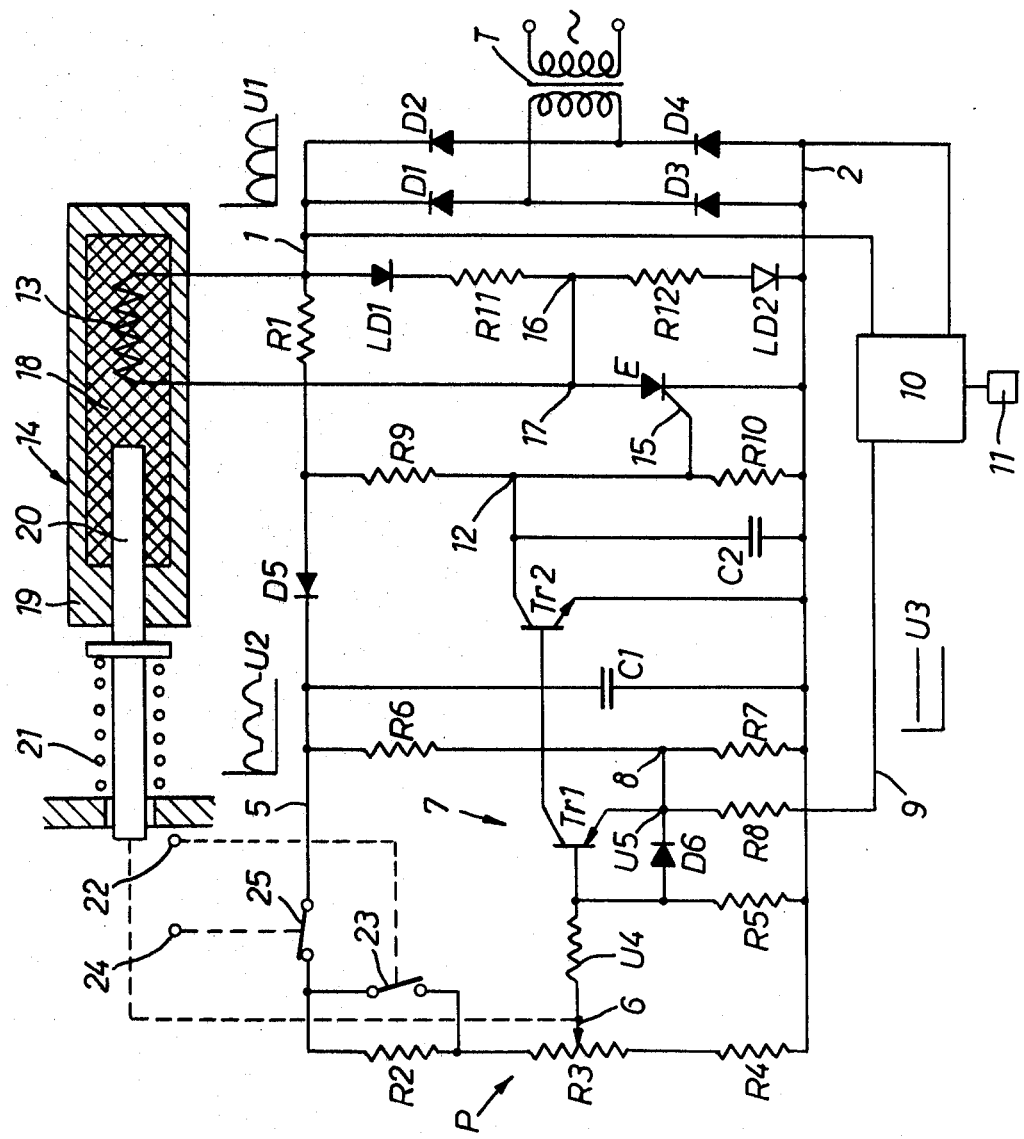

CONTROL CIRCUIT FOR A SERVO-MOTOR

The invention relates to a control circuit for a servo-motor comprising a piston displaceable into selectable positions in the one direction by an expansible substance heatable by an electric heating element and in the other direction by a return spring, in which a control switch in series with the heating element is actuatable according to the piston position.

In a known control circuit of this kind, the control switch responsive to the piston position consists of a stationary contact and a movable contact which is mounted on a stationary mounted lever connected to the piston through a friction clutch. The pivotal motion of the lever is limited by two stationary abutments. This control switch permits the piston to be held in a selected position with a very small amplitude of oscillation because the control switch is closed upon cooling-off movement and opened upon heating movement. To change the selectable position, there is a first, normally open, position switch parallel to the control switch and a second, normally closed, position switch in series with the entire arrangement. By closing the first position switch or by opening the second position switch, the piston can be brought into a new position, the piston being moved by the lever that is being held by one of the stationary abutments.

In another known control circuit, two limit switches are provided of which one switches off the energy supply to the heating element as soon as a predetermined limiting position has been exceeded during the heating movement and of which the other switches on the energy supply to the heating element as soon as a predetermined limiting position has been passed during the cooling-off movement. In particular, the limiting positions can be prescribed by fixed abutments and actuation of the limit switches can be effected in that two piston rod portions interconnected by prestressed springs are moved relatively to one another.

The invention is based on the problem of providing a control circuit of the aforementioned kind, with the aid of which the number of required switches can be reduced and a very simple displacement of the piston effected.

This problem is solved according to the invention in that the selectable position is predetermined by a control voltage, that the piston is connected to the movable part of a potentiometer to signal the position of the piston, that a comparator compares the voltage at the potentiometer tapping with a voltage depending on the control voltage, and that the control switch is controllable according to the result of the comparison.

With this circuit it is sufficient to have a single control switch lying in series with the heating element because this switch can be so actuated that the piston stands still or moves in the one or other direction. By comparing the voltage at the potentiometer tapping with the voltage depending on the control voltage, one not only ensures that the piston is displaced up to the selected position, this automatically resulting in the function of the two known position switches, but also that, without making any additional provisions, as much heating energy is supplied by switching the control switch off and on that the piston remains in the selected position. Since each value of the control voltage corresponds to a certain piston position, a servo-motor equipped in this manner is ideally suited to automatic control circuits in which a control signal that represents a measure of the piston position is obtained from any measuring or guiding parameter. For example, such a servo-motor can be used to displace valves that are provided in a heating, cooling or air-conditioning installation and are controlled in response to a temperature senser. The voltage depending on the control voltage can in special cases also be the control voltage itself.

It is of particular advantage if the control voltage is an adjustable but constant D.C. voltage and the potentiometer is fed with a pulsating D.C. voltage. Since the voltage at the potentiometer tapping will then likewise pulsate, signals for opening and closing the switch will alternately occur at the comparator output in the position of equilibrium. In this way the heating element is supplied with just enough energy to ensure that the piston remains still in the elevated position, i.e. does not oscillate about a selected mean position. By reason of the inertia of the thermally operating parts, a really small frequency of pulsation is adequate, certainly the frequency of 50 Hz of industrial alternating currents.

It is also desirable to provide two limit switches which are each actuatable in one limiting position of the piston and with which the voltage at the potentiometer tapping can be switched to a value below the lower limiting value of above the upper limiting value of the voltage that depends on the control voltage. Since these limit switches are not disposed in the circuit of the heating element but need merely influence relatively small currents in the control circuit, they can be of a very simple and cheap construction.

A very simple circuit is obtained if one side of the tapping an end section of the potentiometer is in parallel with the one, normally open, limit switch and the parallel circuit is in series with the other, normally closed, limit switch.

With particular advantage, an electric control switch is used of which the control electrode is connected to the output of an amplifier controlled by the comparator. Such an electrode control switch not only creates little noise but also operates relatively rapidly, as is the case when the pulsating D.C. voltage is derived from the normal A.C. voltage at the potentiometer tapping. In particular, the electronic control switch may be a thyristor. Thyristors can conduct comparatively large currents and are easy to control.

In a preferred embodiment, it is ensured that the commparator is formed by a first transistor to the base of which the voltage at the potentiometer tapping is applied and to the emitter of which the voltage depending on the control voltage is applied by way of a resistance. Since the control switch knows only two switching conditions, it is sufficient to recognize at the comparator output whether the voltage at the potentiometer tapping is smaller or larger than the control voltage; this is indicated by the conducting or non-conducting condition of the first transistor.

In this case the base and emitter should be connected by a diode poled in the opposite sense to the emitter-base path. The blocking voltage of the diode ensures that the base-emitter path of the first transistor cannot be loaded beyond a voltage of 0.6 V.

Further, a first fixed voltage divider having its tapping connected to the emitter can be in shunt with the potentiometer. The operating point of the first transistor is fixed with the aid of this voltage divider.

In a preferred embodiment, the first transistor is connected by a Darlington connection to a second transistor of which the collector-emitter path bridges the one resistance of a second fixed voltage divider and the control electrode of the electronic control switch is connected to the tapping of this voltage divider. In addition, the collector-emitter path of the second transistor can be in shunt with a condenser. When the second transistor blocks, a voltage determined by the voltage divider is applied to the control electrode of the electronic switch, whereby the electronic control switch opens. On the other hand, if the second transistor is conducting, the control path of the electronic control switch is practically short-circuited and this switch therefore blocks. The condenser keeps random voltage peaks away from the control electrode of the electronic control switch.

It is favourable if, upon connection to an A.C. voltage source, the potentiometer is energized by way of a full-wave rectifier and a subsequent partial smoothing circuit, e.g. with a longitudinal diode and transverse condenser. In this way one obtains a partially smoothed, full-wave rectified voltage which is applied to the potentiometer as a pulsating D.C. voltage with a pulsating frequency of 100 Hz.

It is advisable if the series circuit of the heating element and control switch branches off between the full-wave rectifier and partial smoothing circuit. In this way existing circuit components are used to ensure that the current through the electronic switch becomes zero after each half wave. Using a thyristor ensures that it extinguishes again after each half wave.

Further, between the heating element and control switch there may branch off an indicating line leading to a point between two series-connected, like-poled luminous diodes and the series circuit of the luminous diodes is in shunt with the series circuit of heating element and control switch. If the one luminous diode lights up, the piston moves in the one direction and if the other luminous diode lights up the piston moves in the other direction, the piston being at a standstill if both luminous diodes light up.

The invention will be described in more detail with reference to an example illustrated in the drawing which diagrammatically shows a servo-motor with associated control circuit.

A transformer T is connectible on the primary side to a conventional A.C. mains of 220 V and 50 Hz. On the secondary side one obtains an A.C. voltage of 24 V. This is rectified by means of a rectifier bridge comprising the diodes D1, D2, D3 and D4. A full-wave rectified voltage U1 therefore exists between the two lines 1 and 2. A longitudinal resistance R1, a longitudinal diode D5 and a transverse condenser C1 form a partial smoothing circuit so that a pulsating D.C. voltage U2 is provided between the line section 5 and the line 2.

The voltage U2 feeds a potentiometer P consisting of a fixed resistance R2, a resistance R3 with adjustable tapping 6 and a fixed resistance R4.

A comparator 7 comprises a first transistor Tr1 of which the base is connected to the tapping 6 and is connected to the line 2 through a resistance R5. The emitter is connected to the tapping 8 of a voltage divider consisting of the resistances R6 and R7. It is in addition connected to the base through a diode D6. Finally, a control voltage U3 produced by a control device 10 is applied through a line 9 with a resistance R8. The control device 10 can be of any desired kind. For example, it is influenced by a sensor 11 so that the control voltae U3 is a function of the measured temperature. This control device 10 can, as shown, be energised through the conductors 1 and 2 and may possibly have a smoothing circuit.

The transistor Tr1 is connected to a transistor Tr2 by a Darlington connection. Accordingly, the base of the transistor Tr2 is connected to the collector of the transistor Tr1 and the emitter is connected to the line 2. The collector is connected to a tapping 12 of a voltage divider consisting of the resistances R9 and R10, of which the latter is bridged by a condenser C2. This voltage divider is energised by the voltage U1 taking into account the voltage drop at R1. Similarly, the voltage U1 energises a series circuit consisting of a heating element 13 of a servo-motor 14 and a controllable rectifier or thyristor E, e.g. an SCR. The control electrode 15 of the thyristor E is connected to the tapping 12.

The voltage U1 further energises a series circuit consisting of a luminous diode LD1, a resistance R11, a further resistance R12 and a second luminous diode LD2. A point 16 between the two resistances is connected to a point 17 between the heating element 13 and the thyristor E.

The heating element 13 consists of an expansible substance 18; on expansion of the latter, a piston 20 guided in a housing 19 is pressed towards the left-hand side against the force of a spring 21. This piston can carry any element to be actuated, e.g. the closure member of a valve. The piston 20 is mechanically connected to the tapping 6. In the inner limiting position 22, it actuates a first limit switch 23 which is normally open and bridges the resistance R2 of the potentiometer P. In the outer limiting position 24, it actuates a second limit switch 25 which is normally closed and in series with the potentiometer P. This circuit operates in the following manner: The base voltage U4 of the transistor Tr1 is equal to the voltage at the tapping 6 of the potentiometer P and proportional to the voltage U2. In the absence of the control voltage U3, the emitter voltage U5 is determined solely by the ratio of the voltage divider R6, R7. In the presence of the control voltage U3, the emitter voltage U5 varies according to the control voltage. If the base voltage U4 is larger than the emitter voltage U5, the transistor Tr1 is blocked. As a result, the transistor Tr2 is also blocked. A fraction of the voltage U1 as predetermined by the voltage divider R9, R10 is therefore applied to the tapping 12 and thus to the control electrode 15. The thyristor E ignites shortly after commencement of each half wave and remains conductive until zero is passed on the next occasion. The servo-motor 14 is therefore supplied with heating energy. The piston 20 is displaced to the left and takes the tapping 6 downwardly with it. If the base voltage U4 is smaller than the emitter voltage U5, the transistors Tr1 and Tr2 are conductive. The resistance R10 is practically short-circuited and the control electrode 15 practically has the potential of the line 2. The thyristor E consequently blocks. Since the heating element 13 receives no energy, the expansible substance 18 cools off and the piston 20 is pushed to the right under the action of the return spring 21 and thereby takes the tapping 6 with it upwardly.

If all the voltages were to be constant D.C. voltages and the electronic switch were to be switching transistor which is conductive only whilst the transistor Tr2 blocks, the piston 20 would continuously hunt to and from a position determined by the control voltage U3. This is because when the tapping 6 exceeds a predetermined position during cooling off, the switch is switched on. If, during subsequent heating, the tapping 6 falls below the said position, it is switched off again.

In the present circuit, however, the potentiometer P is supplied with a pulsating D.C. voltage U2 and the electronic switch is a thyristor. As a result, the correspondingly pulsating base voltage U4 will not intersect the constant emitter voltage U5 already on commencement of each half wave of the voltage U1 but only after a certain time delay. One therefore obtains at the thyristor E a phase commencement control by which the heating element 13 is supplied with just sufficient heating energy as is lost by radiation. The piston 20 therefore remains at a standstill. In this respect it is immaterial whether the piston 20 has been brought to the selected new position during changing of the control voltage U3 by cooling off or by heating.

If the piston 20 falls below the lower limiting position 22, the limit switch 23 is closed. The resistance R2 is thereby made ineffective and the base voltage U4 is artificially increased. The transistors Tr1 and Tr2 therefore block and the thyristor E becomes conductive until the lower limiting position 22 is exceeded again and the limit switch 23 opens. If the upper limiting position 24 is exceeded, the limit switch 25 opens. The base voltage U4 falls to the potential of the line 2. The transistors Tr1 and Tr2 become conductive and the thyristor E is blocked until, as a result of cooling off, the upper limiting position 24 is again passed and the limit switch 25 closes. This function can repeat itself in the respective limiting positions.

If the heating coil 13 is heated, the voltage at the point 17 is so low that the luminous diode LD2 will not ignite. The luminous diode LD1 therefore indicates the outward movement of the piston 20. If the thyristor E is blocked, only the luminous diode LD2 will light up and therefore indicate the inward movement of the piston 20. If the piston 20 is at a standstill, the thyristor E is blocked in a first portion of each half-wave impulse of the voltage U1 and conductive in a second portion. The luminous diodes are therefore energised alternately. Since this takes place very rapidly, both luminous diodes appear to light up, which therefore indicates the standstill of the piston.

In a practical embodiment, the voltage U1 had an amplitude of 24 V whilst the control voltage U3 varied between 4 and 20 V. At an ambient temperature of 20° C, both the heating stroke and the cooling-off stroke amounting to a total of 25 mm was traversed in 160 seconds. Voltage variations and changes in the ambient temperature lead to a change of the time required to execute the complete stroke but do not effect the basic functionability. In particular, the servo-motor is useful in a range of −10° C to +55° C of the ambient temperature. Voltage variations of +10% and −15% can also be readily accepted.

The limit switches 23 and 25 can also be power switches which are actuated when, on the piston 20 striking a terminal abutment, a spring is compressed on further heating or expanded on further cooling off. Such a limit switch does not have to be specially set for each application, e.g. actuation of valves having different strokes. The limit switches can also be in series or shunt with the electronic switch.

I claim:

1. A control circuit for a servomotor of the type having a piston displaceable to selectable positions in one heating element and in the other direction by a return spring, said circuit comprising a heating element, a power supply circuit for said heating element including a control switch, first means for generating temperature responsive variable control voltage, second means for generating variable position voltages corresponding to different positions of said piston which means includes a potentiometer with a movable tap and means connecting said piston to said tap, means including comparator means for comparing said control voltage and said piston position voltage and operating said control switch when one of said voltages is larger than the other one.

2. A control circuit according to claim 1 wherein said first voltage generating means generates D.C. voltage and said second voltage generating means generates an A.C. voltage.

3. A control circuit according to claim 1 wherein upper and lower limit switches are associated with said selectable positions for said piston, said limit switches being respectively effective to overide said potentiometer to effect operation of said control switch to either block or direct energy from or to said heating element.

4. A control circuit according to claim 1 wherein said control switch is a thyristor.

5. A control circuit according to claim 1 including first and second light emitting diodes, said diodes being alternately on and off when said control switch is correspondingly opened or closed to give visual indications of the heating and cooling cycles.

* * * * *